(12) United States Patent
Siwiak (10) Patent No.: US 9,544,028 B2
(45) Date of Patent: Jan. 10, 2017

(54) DOPPLER FREQUENCY SHIFT COMPENSATION FOR WIRELESS COMMUNICATION

(71) Applicant: Empire Technology Development LLC, Wilmington, DE (US)

(72) Inventor: Kazimierz Siwiak, Coral Spring, FL (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/764,696

(22) PCT Filed: Jan. 30, 2013

(86) PCT No.: PCT/US2013/023833
§ 371 (c)(1),
(2) Date: Jul. 30, 2015

(87) PCT Pub. No.: WO2014/120151
PCT Pub. Date: Aug. 7, 2014

(65) Prior Publication Data
US 2015/0372722 A1 Dec. 24, 2015

(51) Int. Cl.
  H04B 7/01 (2006.01)
  H04B 1/3822 (2015.01)
  H04L 29/08 (2006.01)
  H04W 4/02 (2009.01)

(52) U.S. Cl.
  CPC ............. *H04B 7/01* (2013.01); *H04B 1/3822* (2013.01); *H04L 67/12* (2013.01); *H04W 4/027* (2013.01)

(58) Field of Classification Search
  CPC ....................................................... H04B 7/01
  See application file for complete search history.

(56) References Cited

U.S. PATENT DOCUMENTS

| | | | |
|---|---|---|---|
| 5,432,521 A | 7/1995 | Siwiak et al. | |
| 5,640,166 A | 6/1997 | Siwiak | |
| 6,377,802 B1 | 4/2002 | McKenna et al. | |
| 8,199,706 B2 | 6/2012 | Bertrand et al. | |
| 8,346,478 B2* | 1/2013 | Roesser ................ | G01C 21/32 224/275 |
| 2005/0195383 A1* | 9/2005 | Breed ................... | B60N 2/002 356/4.01 |
| 2008/0101306 A1 | 5/2008 | Bertrand et al. | |
| 2011/0235590 A1 | 9/2011 | Li et al. | |

FOREIGN PATENT DOCUMENTS

| | | |
|---|---|---|
| CN | 1138925 A | 12/1996 |
| CN | 1228892 A | 9/1999 |
| GB | 2226731 A | 7/1990 |

(Continued)

OTHER PUBLICATIONS

Dahlman, E. et al., "Key features of the LTE radio interface," Ericsson Review 2, Sep 77-80 (Nov. 2008).

(Continued)

*Primary Examiner* — Tuan H Nguyen
(74) *Attorney, Agent, or Firm* — Brundidge & Stanger, P.C.

(57) ABSTRACT

Technologies and implementations for Doppler frequency shift compensation are generally disclosed.

28 Claims, 5 Drawing Sheets

(56) References Cited

FOREIGN PATENT DOCUMENTS

WO    9519666 A1    7/1995
WO    9810532 A1    3/1998

OTHER PUBLICATIONS

Hara, S. et al., "A novel OFDM adaptive antenna array for delayed signal and doppler-shifted signal suppression," IEEE International Conference on Communications, vol. 7, pp. 2302-2306 (2001).
International Search Report and Written Opinion for counterpart International Patent Application No. PCT/US2013/023833 mailed Apr. 11, 2013.
Parkvall, S. et al., "LTE-advanced—evolving LTE towards IMT-advanced," IEEE 68th Vehicular Technology Conference, VTC, pp. 1-5 (Sep. 21-24, 2008).
Petermann, M. et al., "Sum-Rate Evaluation of Beamforming with Limited Feedback for the Evolved UTRA Downlink," In Proceedings of IEEE Workshop on Smart Antennas of ITG, pp. 8 (2007).

* cited by examiner

400 A computer program product

402 A signal bearing medium

404 Machine-readable instructions that, when executed, cause a device to:

>manage wireless signals in a forward area of a vehicle;

>manage wireless signals in a side area of the vehicle;

>manage wireless signals in a rear area of the vehicle;

>receive an indication of velocity information of the vehicle; and

>determine a Doppler frequency shift compensation component associated with at least one of the wireless signals in the forward area, the wireless signals in the side area of the vehicle, or the wireless signals in the rear area of the vehicle based, at least in part, on the received indication of velocity information of the vehicle

| 406 a computer-readable medium | 408 a recordable medium | 410 a communications medium |

DOPPLER FREQUENCY SHIFT COMPENSATION FOR WIRELESS COMMUNICATION

CROSS-REFERENCE TO RELATED APPLICATION

This Application is the U.S. National Stage filing under 35 US.C. §371 of PCT Application Ser. No. PCT/US13/23833 filed on Jan. 30, 2013. The disclosure of the PCT Application is hereby incorporated herein by reference in its entirety.

BACKGROUND

Unless otherwise indicated herein, the approaches described in this section are not prior art to the claims in this application and are not admitted to be prior art by inclusion in this section.

Communications between a moving vehicle and fixed terrestrial infrastructure may be subject to signal deterioration caused by Doppler frequency shifts. Conventional compensation techniques may require updated position and orientation information processed using complex geometries to determine Doppler frequency shift compensation.

SUMMARY

The present disclosure describes various illustrative systems for Doppler frequency shift compensation for wireless communication. Example systems may include a first wireless module on a front of a vehicle configured to manage wireless signals in a forward area of the vehicle, a second wireless module on a side of the vehicle configured to manage wireless signals in a side area of the vehicle, a third wireless module on a rear of the vehicle configured to manage wireless signals in a rear area of the vehicle, a velocity module configured to indicate velocity information of the vehicle, and a signal compensation module communicatively coupled to the first, second, and third wireless modules, and the velocity module, the signal compensation module configured to determine a Doppler frequency shift compensation component associated with at least one of the wireless signals in the forward area of the vehicle, the wireless signals in the side area of the vehicle, or the wireless signals in the rear area of the vehicle based, at least in part, on the velocity information of the vehicle.

The present disclosure also describes various illustrative methods for Doppler frequency shift compensation for wireless communication. Example methods may include managing wireless signals in a forward area, side area, and rear area of a vehicle, receiving an indication of velocity information of the vehicle, and determining a Doppler frequency shift compensation component associated with at least one of the wireless signals in the forward area, side area, or rear area of the vehicle based, at least in part, on the received indication of velocity information of the vehicle.

The present disclosure also describes various example machine readable non-transitory medium having stored therein instructions that, when executed by one or more processors, may cause a wireless communication system to manage wireless signals in a forward area, side area, and rear area of a vehicle, receive an indication of velocity information of the vehicle, and determine a Doppler frequency shift compensation component associated with at least one of the wireless signals in the forward area, side area, or rear area of the vehicle based, at least in part, on the received indication of velocity information of the vehicle.

The foregoing summary is illustrative only and not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure, and are therefore, not to be considered limiting of its scope. The disclosure will be described with additional specificity and detail through use of the accompanying drawings.

In the drawings.

DETAILED DESCRIPTION

The following description sets forth various examples along with specific details to provide a thorough understanding of claimed subject matter. It will be understood by those skilled in the art that claimed subject matter might be practiced without some or more of the specific details disclosed herein. Further, in some circumstances, well-known methods, procedures, systems, components and/or circuits have not been described in detail, in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

This disclosure is drawn, inter alia, to systems, methods, and computer readable media related to Doppler frequency shift compensation for wireless communications between a vehicle and a terrestrial communications infrastructure.

Communications between high speed vehicles and fixed terrestrial infrastructure may be subject to a Doppler frequency shift which may deteriorate the radio link, or even render link establishment impossible. High data rate systems may be particularly vulnerable for high speed vehicles.

Conventional Doppler frequency shift compensation may require knowledge of the positions of the transmitters and receivers and/or determination of vehicle velocity. The angle of transmission and/or reception with respect to the forward direction of the vehicle may be determined, which may facilitate calculation of the Doppler frequency shift caused by the vehicle's motion, which in turn may facilitate Doppler frequency shift compensation. Calculation of the angle may allow for continuous computation of a Doppler frequency shift compensation component, for example, as an airplane passes a base station, a satellite passes overhead, or a car passes a pedestrian.

Commonly, Doppler frequency shift compensation solutions may involve utilization of the location of both the moving vehicle and the stationary communication point (i.e., the portion of vehicle's velocity that may contribute to Doppler frequency shift) may depend on the position and orientation of the vehicle and the stationary communication point. Establishing a communication connection with a target base station may involve complex geometry calculation. This may also mean that changing base stations may involve time consuming determination of positions and angles, which may lead to frequent switching between base stations more difficult for fast moving mobile terminals.

Doppler frequency shift compensation may be provided for wireless communications between a moving vehicle and a terrestrial communications infrastructure. In some examples, Doppler frequency shift compensation may be provided for the vehicle by dividing the vehicle surroundings into areas so that wireless communications associated with each of the areas may compensate for the Doppler frequency shift caused by vehicle motion. In some examples, the Doppler frequency shift compensation performed for an area may be implemented using a wireless module to manage wireless signals in the area, a velocity module to indicate vehicle velocity, and a signal compensation module to determine a Doppler frequency shift compensation component based on the indicated velocity for communications associated with an area. In some examples, a wireless module may manage wireless signals in an area by applying the Doppler frequency shift compensation component associated with the area to transmitted and/or received signals, as appropriate.

Figure 1:
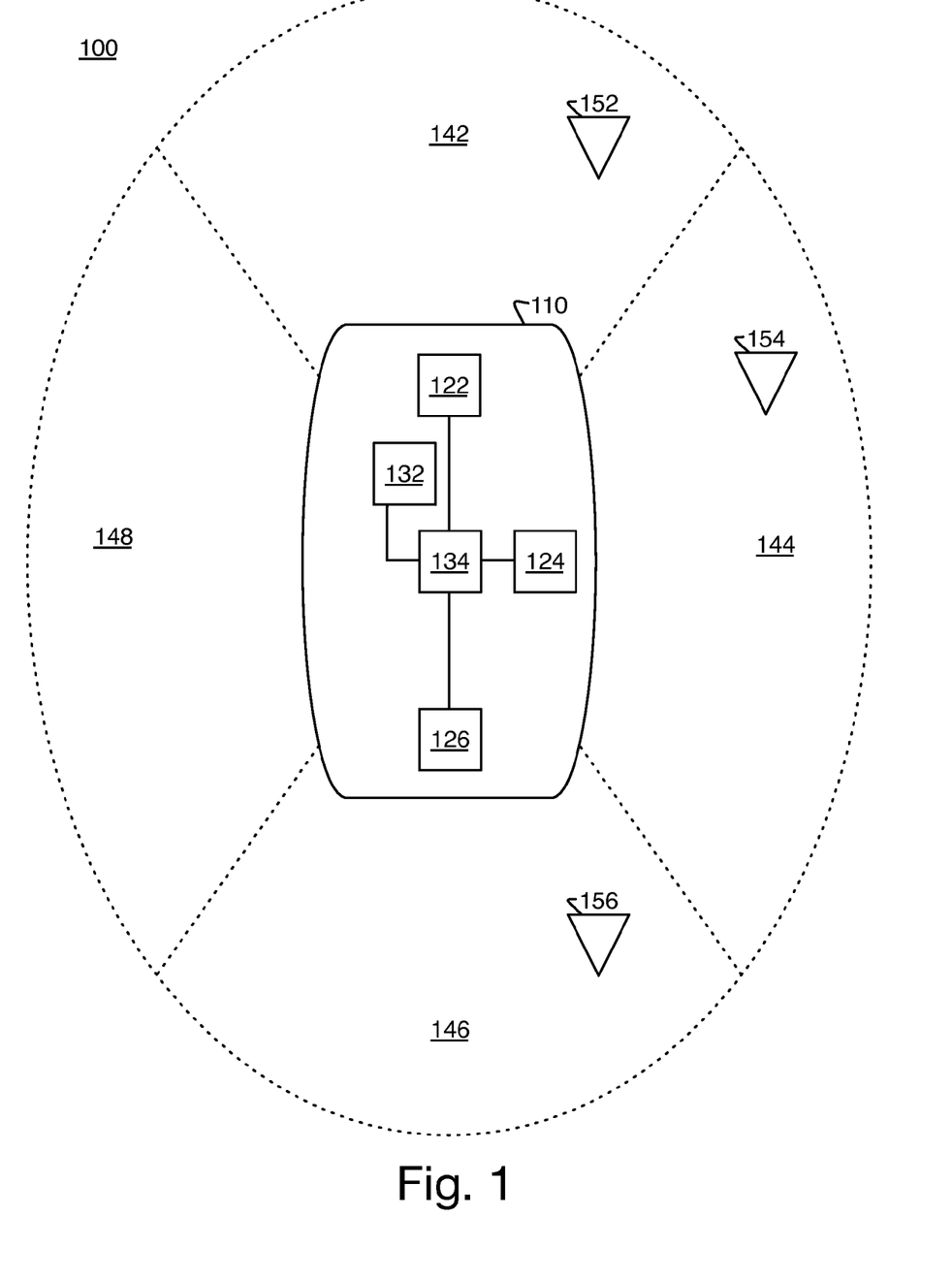
FIG. 1 illustrates a block diagram of an example system for wireless communication.

FIG. 1 is an illustration of a block diagram of an example system 100 for wireless communication, arranged in accordance with at least some embodiments of the present disclosure. As shown, system 100 may include a vehicle 110, a first wireless module 122 disposed on a front of vehicle 110, a second wireless module 124 disposed on a side of vehicle 110, a third wireless module 126 disposed on a rear of vehicle 110, a velocity module 132, and a signal compensation module 134. In general, vehicle 110 may be any type of vehicle. In some examples, vehicle 110 may be a car, a train, a ship, an airplane, or the like. In general, signal compensation module 134 may be communicatively coupled to first wireless module 122, second wireless module 124, third wireless module 126, and/or velocity module 132 using any suitable technique or techniques.

System 100 may also include a forward area 142 of vehicle 110, a side area 144 of vehicle 110, an opposite side area 148 of vehicle 110, a rear area 146 of vehicle 110, a first base station 152 generally located within forward area 142, a second base station 154 generally located within side area 144, and a third base station 156 generally located within the rear area 146. In general, first wireless module 122 may manage wireless signals in forward area 142, second wireless module 124 may manage wireless signals in side area 144, and/or third wireless module 126 may manage wireless signals in rear area 146. It should be appreciated that side area 144 and opposite side area 148 could be any side of vehicle 110 as appropriate. In some examples, second wireless module 124 may be configured to manage wireless signals in at least one of side area 144 or opposite side area 148. In some examples, second wireless module 124 may be configured to manage wireless signals in both side area 144 and opposite side area 148. As shown, in some examples, system 100 may include three base stations 152, 154, and/or 156. In general, vehicle 110 may communicate with any number of base stations in any locations. In some examples, base stations 152, 154, and/or 156 may have fixed locations.

The surroundings of vehicle 110 may be divided into substantially separate areas, for example areas 142, 144, and 146. In some examples, wireless signals in areas 142, 144, and/or 146 may be managed by corresponding wireless modules 122, 124, and/or 126, respectively. Wireless signals in each area may be managed separately, for example, by providing particular Doppler frequency compensation for wireless communications in forward area 142 and providing potentially different particular Doppler frequency compensation in rear area 146. In some examples, the provided Doppler frequency compensation for an area may be related to the fixed angle of the area to the direction of vehicle travel. This approach may facilitate less complicated calculation of the Doppler frequency shift compensation component for each area. In some examples, the determined Doppler frequency shift compensation component may partially compensate for wireless communication with one or more base stations within an area. For example, a determined Doppler frequency compensation component for an area may be substantially different from a more precisely determined Doppler frequency compensation component. However, partial compensation may still improve the signal quality of wireless communications.

In general, Doppler frequency shift compensation may be performed by wireless modules 122, 124, and/or 126 to improve wireless communication quality with base stations 152, 154, and/or 156 located in corresponding areas 142, 144 and/or 146. In some examples, the Doppler frequency shift compensation for an area may be determined by signal compensation module 134 based in part on velocity information from velocity module 132 and may be appropriate for wireless communications with any terrestrial infrastructure in the area. The Doppler frequency shift compensation component determined for an area may be determined using any suitable technique or techniques. In some examples, the Doppler frequency shift compensation component may be associated with the angle of greatest compensation within the area, the angle of least compensation within the area, the angle of average compensation within the area, or any angle in a range of angles in the area. In general, Doppler frequency shift compensation may be performed using any appropriate technique or techniques. In some examples, Doppler frequency shift compensation may be performed using frequency shift circuitry, a computing device configured to perform frequency shifting, or the like. In some examples, signal compensation module 134 may provide a Doppler frequency shift compensation component associated with wireless compensation modules 122, 124, and/or 126 so that wireless modules 122, 124, and/or 126 may transform transmitting and/or received signals. In some examples, signal compensation module 134 may perform Doppler frequency shift compensation to signals transmitted and/or received at wireless compensation modules 122, 124, and/or 126.

In some examples, wireless modules 122, 124, and/or 126 may manage wireless signals by transmitting and/or receiving wireless signals. In general, wireless modules 122, 124, and/or 126 may be configured to transmit and/or receive wireless signals in associated areas 142, 144, and/or 146, for example to communicate with base stations 152, 154, and/or 156 respectively located in areas 142, 144, and 146. In some examples, one or more antennas may be communicatively coupled to wireless modules 122, 124, and/or 126 to transmit and/or receive signals. In some examples, wireless modules 122, 124, and/or 126 may include one or more antennas. In some examples, the antennas may be directional antennas. In some examples, a directional antenna may be configured to transmit and/or receive wireless signals covering approximately +/−45 degrees angle relative to a normal direction in the area of vehicle 110 corresponding to wireless modules 122, 124, and/or 126. In some examples, a directional antenna may be configured to transmit and/or receive wireless signals covering substantially (or approximately) the area of vehicle 110 corresponding to wireless modules 122, 124, and/or 126. In general, any suitable antenna angle and/or directional sensitivity may be used, for example to provide coverage in an associated area and/or to limit coverage in other areas.

In some examples, one or more of wireless modules 122, 124, and/or 126 may transmit and/or receive signals without performing Doppler frequency shift compensation. In some examples, no Doppler frequency shift compensation may be performed when vehicle 110 is travelling relatively slowly and/or when vehicle 110 transmits and/or receives in a direction substantially perpendicular to the direction of travel.

In general, the Doppler frequency shift of wireless communications between vehicle 110 and base stations 152, 154, and/or 156 may depend on the speed of vehicle 110 and/or the area 142, 144, and/or 146 associated with wireless module 122, 124, and/or 126 in communication with base station 152, 154, and/or 156. In general, velocity module 132 may provide vehicle velocity information that may be used to determine appropriate Doppler frequency shift compensation. In general, velocity module 132 may be any suitable device that may indicate velocity information of vehicle 110. In some examples, velocity module 132 may include a speedometer, a global positioning system (GPS), a microelectromechanical system (MEMS) velocity sensor, or the like. In some examples, velocity module 132 may indicate the speed of vehicle 110. In some examples, velocity module 132 may indicate the forward component part of the motion of vehicle 110, such as the dot product of the motion of vehicle 110 and vehicle 110 forward direction.

Signal compensation module 134 may determine a Doppler frequency shift compensation component associated with an area as appropriate for the current vehicle velocity. In general, a Doppler frequency shift compensation component may be determined for an area using any technique or techniques. In some examples, signal compensation module 134 may include a computing device, a lookup table, or the like. In general, signal compensation module 134 may determine a Doppler frequency shift compensation component associated with at least one of the wireless signals in forward area 142, side area 144, and/or rear area 146 of vehicle 110 based at least in part on the velocity information of vehicle 110. In some examples, signal compensation module 134 may compute passively one or more Doppler frequency shift compensation components. In some examples, a Doppler frequency shift compensation component for a received signal in one or more of areas 142, 144, and/or 146 may be the reverse (that is, the opposite sign) of the Doppler frequency shift compensation component for a transmitted signal in the same area, and vice versa. In some examples, a Doppler frequency shift compensation component for a received signal in an area 142, 144, and/or 146 may be substantially the same as or similar to the Doppler frequency shift compensation component for a transmitted signal in an opposite area relative to the direction of travel, and vice versa.

In general, signal compensation module 134, first wireless module 122, second wireless module 124, third wireless module 126, and/or velocity module 132 may be communicatively coupled using any suitable technique or techniques. In some examples, modules 122, 124, 126, 132, and/or 134 may be communicatively coupled using a bus, Ethernet, and/or wireless communications, or the like, or any combination thereof. In some examples, modules 122, 124, 126, 132, and/or 134 may be indirectly connected such as through the use of a hub, bridge, and/or switch.

Vehicle 110 may communicate wirelessly with first base station 152, second base station 154, and/or third base station 156. In general, the wireless communication may use any suitable communications techniques or protocols. In some examples, vehicle 110 may communicate with base stations 152, 154, and/or 156 using orthogonal frequency-division multiplexing (OFDM) techniques, code division multiplexing algorithm (CDMA) techniques such as those implemented using the CDMA2000 family of standards, 3rd generation (3G) communications techniques, 4th generation (4G) communications techniques, long-term evolution (LTE) communications techniques, or the like. In some examples, vehicle 110 may provide an on-board communications system configured to link the passengers of vehicle 110 to wireless communication system 100.

In some examples, concurrent wireless communications in different areas may be provided. In some examples, base stations 152, 154, and/or 156 may concurrently wirelessly communicate with vehicle 110 via corresponding wireless modules 122, 124, and/or 126. In some examples, managing wireless signals in different areas may also facilitate fast switching among different base stations 152, 154, and/or 156 in areas 142, 144, and/or 146.

Figure 2:
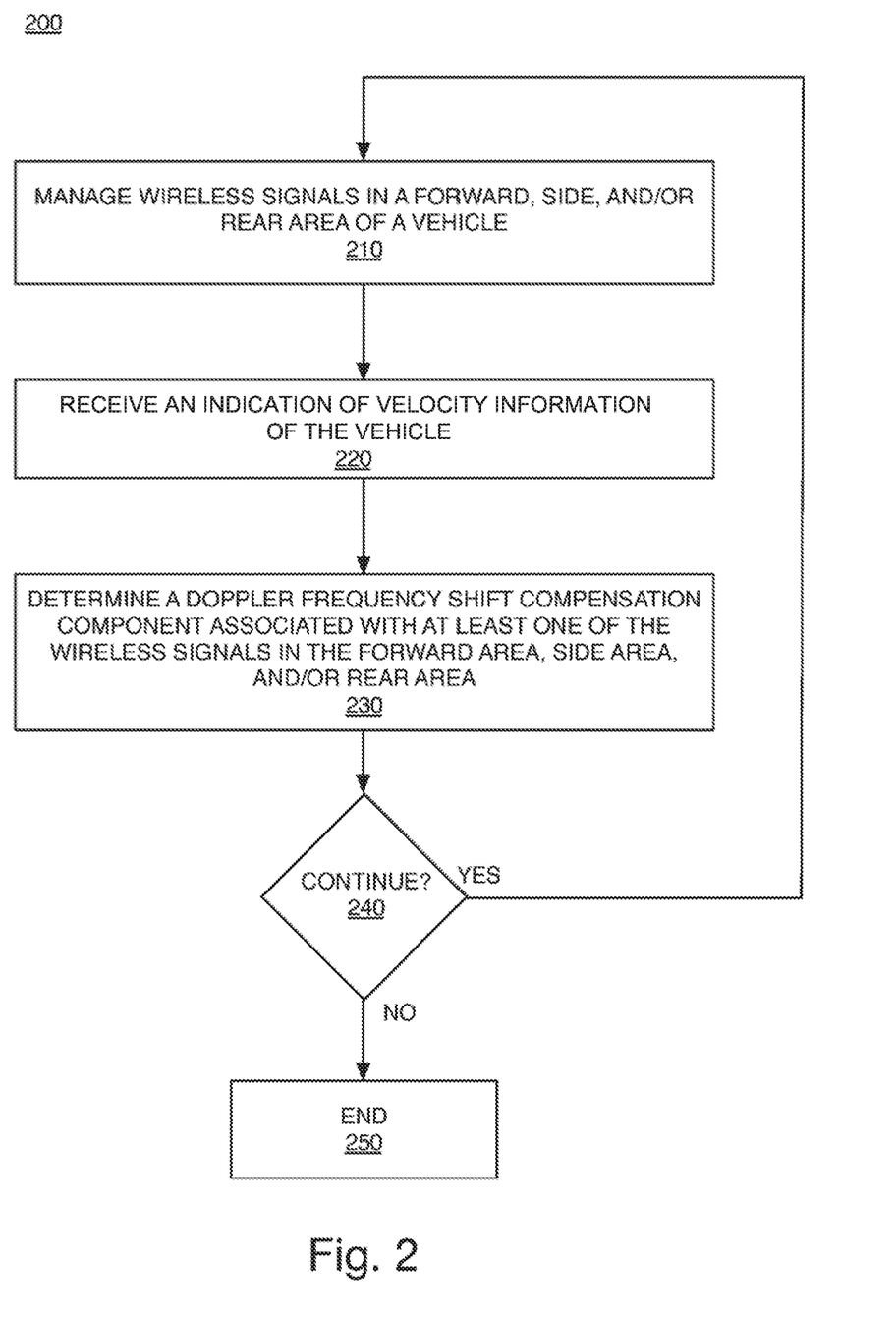
FIG. 2 illustrates a flow diagram of an example method for wireless communication.

FIG. 2 is an illustration of a flow diagram of an example method 200 for Doppler frequency shift compensation for a vehicle, arranged in accordance with at least some embodiments of the present disclosure. In general, method 200 may be performed by any suitable device, devices, or system such as those described herein. In some examples, method 200 may be performed by system 100 and/or system 300 (shown in FIG. 3). In some examples, method 200 may be performed by a general purpose computer. In some examples, method 200 may be performed by a mobile computing device such as a laptop computer, a mobile phone, a smartphone, a netbook device, a tablet device, a personal digital assistant, or the like. Method 200 sets forth various functional blocks or actions that may be described as processing steps, functional operations, events and/or acts, etc., which may be performed by hardware, software, and/or firmware. Numerous alternatives to the functional blocks shown in FIG. 2 may be practiced in various implementations. For example, intervening actions not shown in FIG. 2 and/or additional actions not shown in FIG. 2 may be employed and/or some of the actions shown in FIG. 2 may be eliminated, without departing from the scope of claimed subject matter. Method 200 may include one or more of functional operations as indicated by one or more of blocks 210, 220, 230, 240, and/or 250. The process of method 200 may begin at block 210.

At block 210, "Manage wireless signals in a forward area, a side area, and/or a rear area of the vehicle", wireless signals in a forward area, side area, and/or rear area of the vehicle may be managed. In some examples, wireless signals may be managed in at least one of a side area of a vehicle or an opposite side area of the vehicle. In general, the wireless signals may include any suitable signals and may be transmitted and/or received using any suitable techniques. Wireless signals may include transmissions from a vehicle to a base station and/or reception of transmissions from a base station to a vehicle. In general, wireless signals in an area may be managed in part by providing a Doppler frequency shift compensation component to correct for the Doppler frequency shift arising from vehicle motion. In some examples, wireless signals in an area may be managed in part by establishing one or more connections to base station(s), transmitting and/or receiving data, switching base stations, assessing connection quality, and/or finding new base stations, or the like.

In general, wireless signals may be managed, in part, using one or more antennas. In some examples, a single antenna may be used to communicate in one or more areas. In some examples, separate antennas may be used for communication in different areas. In some examples, managing a wireless signal in a forward area, side area, and/or rear area of a vehicle may comprise transmitting and receiving wireless signals covering approximately +/−45 degrees angle relative to a normal direction in a forward area, side area, and/or rear area of a vehicle. In some examples, managing a wireless signal in a forward area, side area, and/or rear area of a vehicle may comprise transmitting and receiving wireless signals covering substantially (or approximately) a forward area, one or more side areas, and/or a rear area of a vehicle. In some examples, a high gain antenna may be configured so that the radiation pattern provides improved gain in the desired direction and/or area. In some examples, it may be desirable to configure an antenna so that the radiation pattern in a non-desired direction and/or area may be attenuated. In some examples, attenuation in a non-desired direction and/or area may be achieved by any suitable electromagnetic/radio frequency (RF) shielding. The process of method 200 may continue at block 220.

At block 220, "Receive an indication of velocity information of the vehicle", indications of velocity information of the vehicle may be received. In general, indications of velocity information may describe how fast the vehicle is moving. In some examples, indications of velocity information may be received from a speedometer, a global positioning system (GPS), or a microelectromechanical system (MEMS) velocity sensor, or the like. In general, indications of velocity information could use any format that may describe vehicle speed and/or vehicle direction. The process of method 200 may continue at block 230.

At block 230, "Determine a Doppler frequency shift compensation component associated with at least one of the wireless signals in the forward area, side area, and/or rear area", a Doppler frequency shift compensation component associated with at least one of the wireless signals in the forward area, side area, and/or rear area of the vehicle may be determined based, at least in part, on the received indication of velocity information of the vehicle. In some examples, the Doppler frequency compensation component determination may be based, at least in part, on a relationship between the received indication of velocity information of the vehicle, a nominal transmitter frequency and/or receiver frequency for the wireless signals, and the propagation speed of light.

For example, if a vehicle moves at a given speed toward a base station in the forward area of the vehicle, a Doppler frequency shift compensation component may be determined to compensate for the perceived increase in received frequencies and/or to transmit at a lower frequency so that the Doppler effect causes the base station to receive transmitted signals at the expected frequencies. In some examples, the Doppler frequency shift compensation component may be determined without a coordinate location of the base station and/or the vehicle, but instead the Doppler frequency shift compensation component may be determined based at least in part on vehicle speed and the area of the vehicle communicating with the base station. The process of method 200 may continue at block 240.

At decision block 240, the process of method 200 may determine whether method 200 continues at block 210, "Manage wireless signals in a forward area, a side area, and/or a rear area of the vehicle". In some examples, if method 200 continues to block 210, "Manage wireless signals in a forward area, a side area, and/or a rear area of the vehicle", the determined Doppler frequency shift compensation component of block 230, "Determine a Doppler frequency shift compensation component associated with at least one of the wireless signals in the forward area, side area, and/or rear area of the vehicle" may be utilized to manage wireless signal(s) at block 210, "Manage wireless signals in a forward area, a side area, and/or a rear area of the vehicle". If the process of method 200 at decision block 240 determines not to continue, then the process of method 200 ends at block 250, "End".

Figure 3:
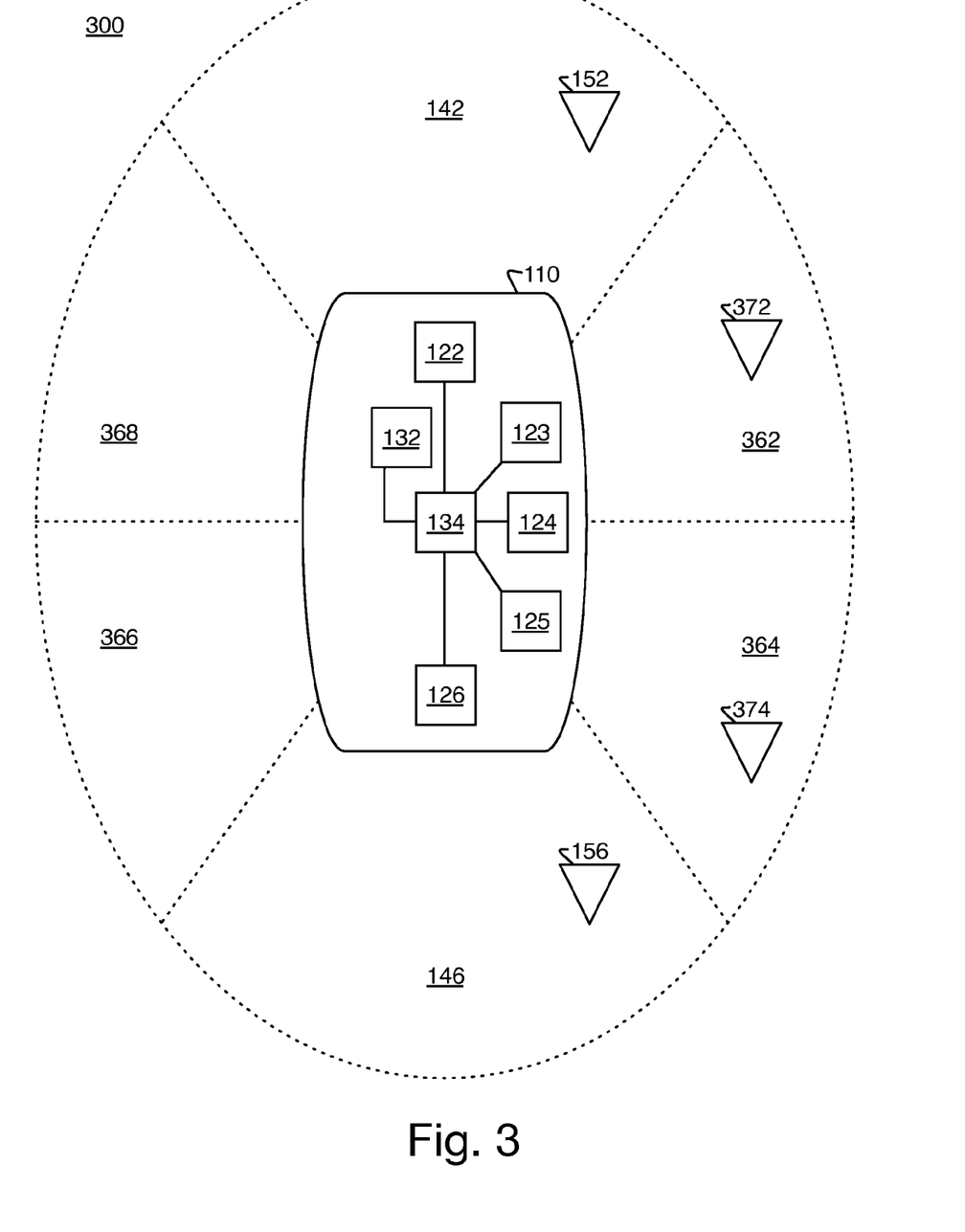
FIG. 3 illustrates a block diagram of an example system for wireless communication.

FIG. 3 is an illustration of a block diagram of an example system 300 for wireless communication, arranged in accordance with at least some of embodiments of the present disclosure. As shown, system 300 may include base stations 152 and 156 associated with front area 142 and rear area 146, respectively, with signals managed by wireless modules 122 and 126, respectively. As described below, wireless module 124 may manage signals for one or more side areas. Wireless modules 122, 123, 124, 125 and/or 126 may manage wireless signals in associated areas, for example by transmitting and/or receiving Doppler frequency shift compensated wireless signals for wireless communications in the associated areas. As shown, wireless modules 122, 123 124, 125 and/or 126 may be communicatively coupled to signal compensation module 134 and/or velocity module 132. As described, signal compensation module 134 may be configured to determine a Doppler frequency shift compensation component associated with one or more of the wireless modules 122, 123, 124, 125 and/or 126. Signal compensation module 134 may determine one or more Doppler frequency shift compensation components based at least in part on velocity information indicated by velocity module 132. In general, any combination of the implementations described herein may be implemented in system 300, in particular with respect to implementations described in FIG. 1.

As shown in FIG. 3, system 300 may include one or more side areas, 362 and 364, and one or more opposite side areas, 366 and 368. System 300 may include base stations 372 and 374, located in side areas 362 and 364, respectively. One or more wireless modules 124 may manage wireless signals in areas 362 and 364, which may facilitate wireless communication between vehicle 110 and base stations 372 and 374.

Vehicle 110 may communicate with base stations 152, 156, 372, and/or 374 via wireless modules 122, 123, 124, 125, and/or 126. Wireless modules 122, 123, 124, 125, and/or 126 may transmit and/or receive wireless signals in associated areas 142, 146, 362, 364, 366, and/or 368. Wireless modules 122, 123, 124, 125, and/or 126 may be communicatively coupled to one or more antennas, as described herein, particularly with respect to implementations described with respect to FIG. 1.

The surroundings of vehicle 110 may be divided into substantially separate areas, for example areas 142, 146, 362, 364, 366, and 368. In some examples, wireless signals in areas 142, 146, 362, 364, 366, and/or 368 may be managed by one or more corresponding wireless modules 122, 123, 124, 125, and 126. In some examples, wireless signals in forward area 142 and rear area 146 may be managed by wireless modules 122 and 126, respectively. In some examples, wireless signals in one or more side areas 362, 364, 366, and/or 368 may be managed by one or more wireless modules 123, 124, and/or 125. In some examples, wireless signals in each side area 362, 364, 366, and 368 may be individually managed by a corresponding wireless module 124. In some examples, wireless signals in multiple areas, for example areas 362 and 368, may be managed by a single wireless module 124. Similarly, in some examples wireless signals in areas 364 and 366 may be managed by a single wireless module. In some examples, wireless signals in areas 362, 364, 366, and 368 may be managed by a single wireless module.

As described above, the surroundings of vehicle 110 may be divided into substantially separate areas. Systems 100 and 300 illustrate example divided areas, inter alia. In some examples, the surroundings of vehicle 110 may be divided into various sizes. In some examples, each of the divided areas may be substantially equivalent in size, for example system 100 illustrates four divided areas: forward area 142, side area 144, and/or rear area 146 of vehicle 110. In this example, the angle of coverage for each area may be substantially 90°. In general, for a system having an arbitrary number of divided areas, the coverage for each area may substantially correspond to the total area, 360°, divided by the number of divided areas. In some examples, the divisions may not be equivalent, for example one divided area may cover a larger area than another. In some examples, coverage may overlap, have weak spots, and/or have dead spots. In some examples, coverage may not be provided for each divided area.

In some examples, a Doppler frequency shift compensation component for a received signal in one or more of areas 142, 146, 362, 364, 366, and/or 368 may be the reverse (opposite sign) of the Doppler frequency shift compensation component for a transmitted signal in the same area, and vice versa. In some examples, a Doppler frequency shift compensation component for a received signal in an area 142, 146, 362, 364, 366, and/or 368 may be the same as or similar to the Doppler frequency shift compensation component for a transmitted signal in an opposite area relative to the vehicle velocity, and vice versa.

Figure 4:
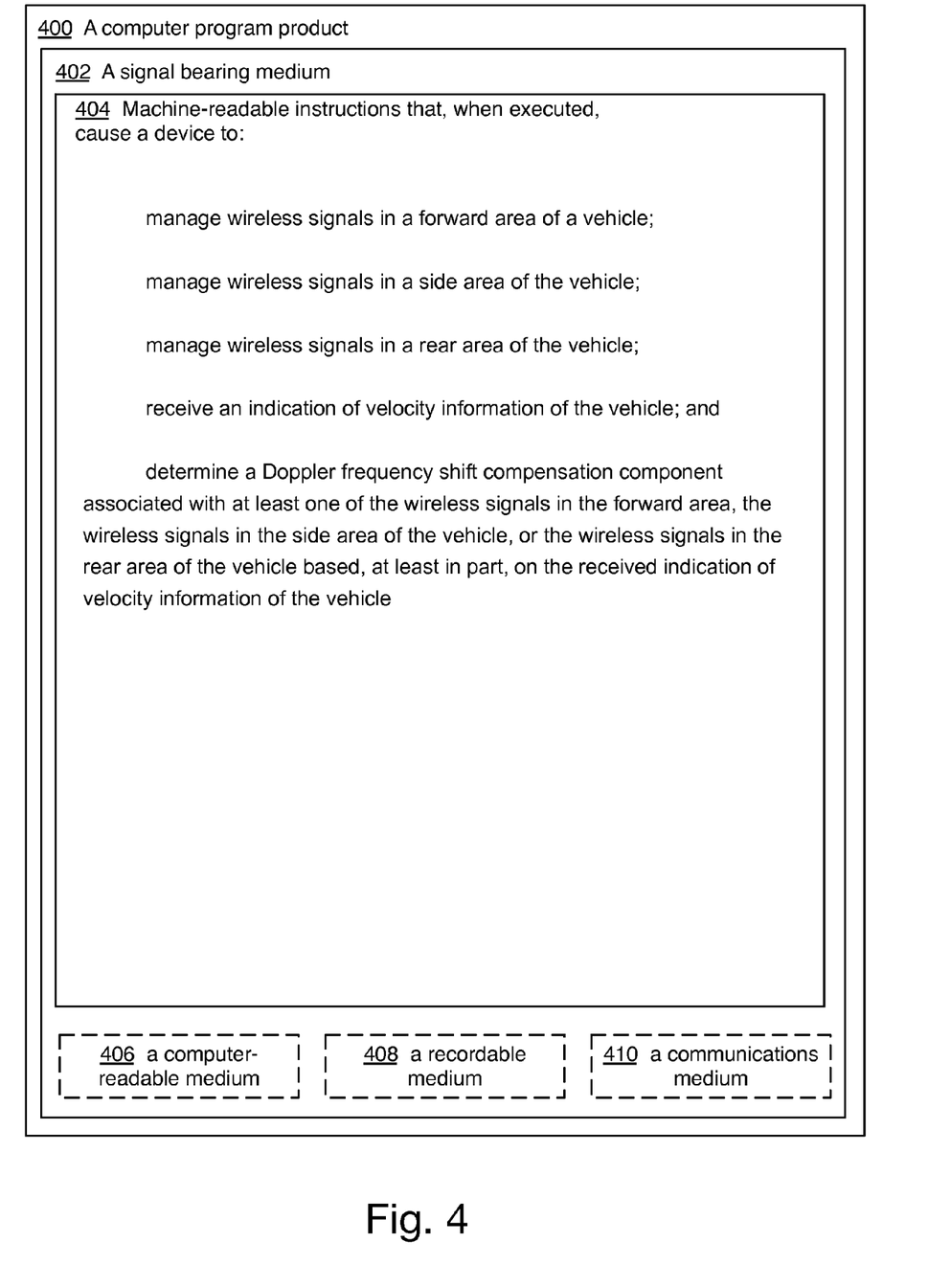
FIG. 4 illustrates an example computer program product.

FIG. 4 is an illustration of an example computer program product 400, arranged in accordance with at least some embodiments of the present disclosure. Computer program product 400 may include machine readable non-transitory medium having stored therein a plurality of instructions that, when executed, cause the machine to provide wireless communications according to the processes and methods described herein. Computer program product 400 may include a signal bearing medium 402. Signal bearing medium 402 may include one or more machine-readable instructions 404, which, when executed by one or more processors, may operatively enable a computing device to provide the functionality described herein. In some examples, machine-readable instructions 404 may be provided as web browser software. In some examples, machine-readable instructions 404 may be provided as a web browser plug-in. In various examples, some or all of the machine-readable instructions may be used by the devices described herein.

In some implementations, signal bearing medium 402 may encompass a computer-readable medium 406, such as, but not limited to, a hard disk drive, a Compact Disc (CD), a Digital Versatile Disk (DVD), a digital tape, memory, etc. In some implementations, signal bearing medium 402 may encompass a recordable medium 408, such as, but not limited to, memory, read/write (R/W) CDs, R/W DVDs, etc. In some implementations, signal bearing medium 402 may encompass a communications medium 410, such as, but not limited to, a digital and/or an analog communication medium (e.g., a fiber optic cable, a waveguide, a wired communication link, a wireless communication link, etc.). In some examples, signal bearing medium 402 may encompass a machine readable non-transitory medium.

Figure 5:
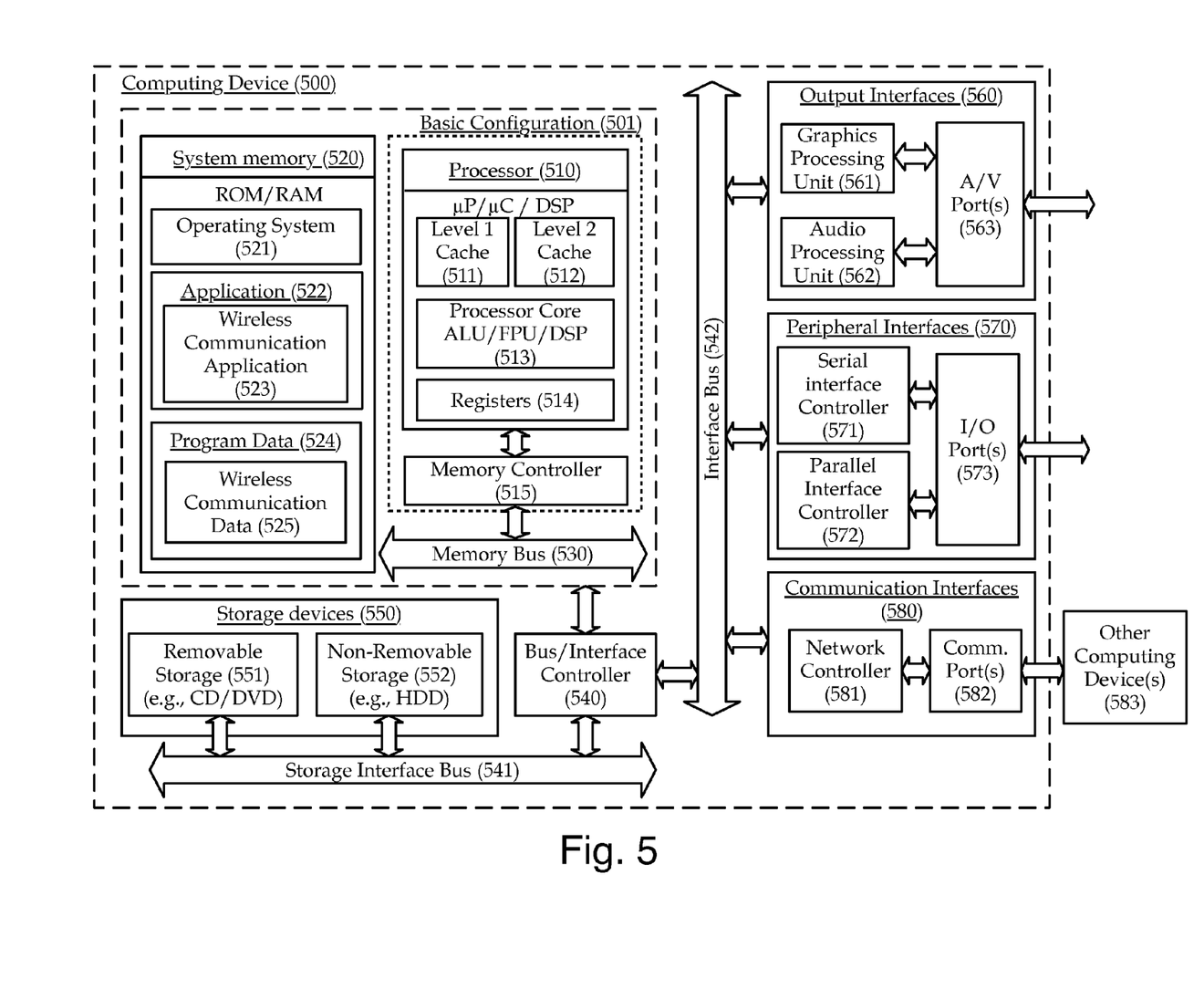
FIG. 5 illustrates a block diagram of an example computing device, all arranged in accordance with at least some embodiments of the present disclosure.

FIG. 5 is a block diagram illustrating an example computing device 500, arranged in accordance with at least some embodiments of the present disclosure. In various examples, computing device 500 may be configured to provide wireless communication as described herein. In one example basic configuration 501, computing device 500 may include one or more processors 510 and system memory 520. A memory bus 530 can be used for communicating between the processor 510 and the system memory 520.

Depending on the desired configuration, processor 510 may be of any type including but not limited to a microprocessor (µP), a microcontroller (µC), a digital signal processor (DSP), or any combination thereof. Processor 510 can include one or more levels of caching, such as a level one cache 511 and a level two cache 512, a processor core 513, and registers 514. The processor core 513 can include an arithmetic logic unit (ALU), a floating point unit (FPU), a digital signal processing core (DSP Core), or any combination thereof. A memory controller 515 can also be used with the processor 510, or in some implementations the memory controller 515 can be an internal part of the processor 510.

Depending on the desired configuration, the system memory 520 may be of any type including but not limited to volatile memory (such as RAM), non-volatile memory (such as ROM, flash memory, etc.) or any combination thereof. System memory 520 may include an operating system 521, one or more applications 522, and program data 524. Application 522 may include wireless communication application 523 that can be arranged to perform the functions, actions, and/or operations as described herein including the functional blocks, actions, and/or operations described herein. Program Data 524 may include wireless communication data 525 for use with wireless communication application 523. In some example embodiments, application 522 may be arranged to operate with program data 524 on an operating system 521. This described basic configuration is illustrated in FIG. 5 by those components within dashed line 501.

Computing device 500 may have additional features or functionality, and additional interfaces to facilitate communications between the basic configuration 501 and any required devices and interfaces. For example, a bus/interface controller 540 may be used to facilitate communications between the basic configuration 501 and one or more data storage devices 550 via a storage interface bus 541. The data storage devices 550 may be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 520, removable storage 551 and non-removable storage 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of device 500.

Computing device 500 may also include an interface bus 542 for facilitating communication from various interface devices (e.g., output interfaces, peripheral interfaces, and communication interfaces) to the basic configuration 501 via the bus/interface controller 540. Example output interfaces 560 may include a graphics processing unit 561 and an audio processing unit 562, which may be configured to communicate to various external devices such as a display or speakers via one or more NV ports 563. Example peripheral interfaces 570 may include a serial interface controller 571 or a parallel interface controller 572, which may be configured to communicate with external devices such as input devices (e.g., keyboard, mouse, pen, voice input device, touch input device, etc.) or other peripheral devices (e.g., printer, scanner, etc.) via one or more I/O ports 573. An example communication interface 580 includes a network controller 581, which may be arranged to facilitate communications with one or more other computing devices 583 over a network communication via one or more communication ports 582. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 500 may be implemented as a portion of a small-form factor portable (or mobile) electronic device such as a cell phone, a mobile phone, a tablet device, a laptop computer, a personal data assistant (PDA), a personal media player device, a wireless web-watch device, a personal headset device, an application specific device, or a hybrid device that includes any of the above functions. Computing device 500 may also be implemented as a personal computer including both laptop computer and non-laptop computer configurations. In addition, computing device 500 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communication link, a wireless communication link, etc.).

The herein described subject matter sometimes illustrates different components contained within, or connected with, different other components. It is to be understood that such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A wireless communication system, comprising:
a first wireless module disposed on a front of a vehicle, the first wireless module configured to manage wireless signals in a forward area of the vehicle;
a second wireless module disposed on a side of the vehicle, the second wireless module configured to manage wireless signals in a side area of the vehicle;
a third wireless module disposed on a rear of the vehicle, the third wireless module configured to manage wireless signals in a rear area of the vehicle;
a velocity module configured to indicate velocity information of the vehicle; and
a signal compensation module communicatively coupled to the first wireless module, the second wireless module, the third wireless module, and the velocity module, the signal compensation module configured to determine a Doppler frequency shift compensation component associated with at least one of the wireless signals in the forward area of the vehicle, the wireless signals in the side area of the vehicle, or the wireless signals in the rear area of the vehicle based, at least in part, on a relationship between the velocity information of the vehicle, a nominal frequency for the wireless signals, and the propagation speed of light.

2. The wireless communication system of claim 1, wherein each of the first wireless module, the second wireless module, and the third wireless module includes a directional antenna.

3. The wireless communication system of claim 2, wherein the directional antenna of the first wireless module is configured to transmit and receive wireless signals covering substantially the forward area of the vehicle.

4. The wireless communication system of claim 2, wherein the directional antenna of the second wireless module is configured to transmit and receive wireless signals covering substantially the side area of the vehicle.

5. The wireless communication system of claim 2, wherein the directional antenna of the third wireless module is configured to transmit and receive wireless signals covering substantially the rear area of the vehicle.

6. The wireless communication system of claim 1, wherein the velocity module comprises a speedometer.

7. The wireless communication system of claim 1, wherein the velocity module comprises a global positioning system (GPS).

8. The wireless communication system of claim 1, wherein the signal compensation module is further configured to determine the Doppler frequency shift compensation component for transmitting wireless signals based, at least in part, on a relationship between the velocity information of the vehicle, a nominal transmitter frequency for the wireless signals, and the propagation speed of light.

9. The wireless communication system of claim 1, wherein the signal compensation module is further configured to determine the Doppler frequency shift compensation component for receiving wireless signals based, at least in part, on a relationship between the velocity information of the vehicle, a nominal receiver frequency for the wireless signals, and the propagation speed of light.

10. The wireless communication system of claim 1, wherein the second wireless module is further configured to manage wireless signals in at least one of the side area of the vehicle or an opposite side area of the vehicle.

11. In a wireless communication system, a method for compensating for Doppler frequency shift, comprising:
managing wireless signals in a forward area of a vehicle;
managing wireless signals in a side area of the vehicle;
managing wireless signals in a rear area of the vehicle;
receiving an indication of velocity information of the vehicle; and
determining a Doppler frequency shift compensation component associated with at least one of the wireless signals in the forward area, the wireless signals in the side area of the vehicle, or the wireless signals in the rear area of the vehicle based, at least in part, on a relationship between the velocity information of the vehicle, a nominal frequency for the wireless signals, and the propagation speed of light.

12. The method for compensating for Doppler frequency shift of claim 11, wherein managing the wireless signals in the forward area of the vehicle comprises transmitting and receiving wireless signals covering substantially the forward area of the vehicle.

13. The method for compensating for Doppler frequency shift of claim 11, wherein managing the wireless signals in the side area of the vehicle comprises transmitting and receiving wireless signals covering substantially the side area of the vehicle.

14. The method for compensating for Doppler frequency shift of claim 11, wherein managing the wireless signals in the rear area of the vehicle comprises transmitting and receiving wireless signals covering substantially the rear area of the vehicle.

15. The method for compensating for Doppler frequency shift of claim 11, wherein receiving the indication of velocity information of the vehicle comprises receiving the indication from a speedometer.

16. The method for compensating for Doppler frequency shift of claim 11, wherein receiving the indication of velocity information of the vehicle comprises receiving the indication from a global positioning system (GPS).

17. The method for compensating for Doppler frequency shift of claim 11, wherein determining the Doppler frequency shift compensation component is based, at least in part, on a relationship between the received indication of velocity information of the vehicle, a nominal transmitter frequency for the wireless signals, and the propagation speed of light.

18. The method for compensating for Doppler frequency shift of claim 11, wherein determining the Doppler frequency shift compensation component is based, at least in part, on a relationship between the received indication of velocity information of the vehicle, a nominal receiver frequency for the wireless signals, and the propagation speed of light.

19. The method for compensating for Doppler frequency shift of claim 11, further comprising:
managing wireless signals in at least one of the side areas of the vehicle or an opposite side area of the vehicle.

20. A machine-readable non-transitory medium having stored therein instructions that, when executed by one or more processors, operatively enable a wireless communication system to:
manage wireless signals in a forward area of a vehicle;
manage wireless signals in a side area of the vehicle;
manage wireless signals in a rear area of the vehicle;
receive an indication of velocity information of the vehicle; and
determine a Doppler frequency shift compensation component associated with at least one of the wireless signals in the forward area, the wireless signals in the side area of the vehicle, or the wireless signals in the rear area of the vehicle based, at least in part, on a relationship between the received indication of velocity information of the vehicle, a nominal frequency for the wireless signals, and the propagation speed of light.

21. The machine-readable non-transitory medium of claim 20, wherein the stored instructions, when executed by one or more processors, further operatively enable the wireless communication system to transmit and receive wireless signals covering substantially the forward area of the vehicle.

22. The machine-readable non-transitory medium of claim 20, wherein the stored instructions, when executed by one or more processors, further operatively enable the wireless communication system to transmit and receive wireless signals covering substantially the side area of the vehicle.

23. The machine-readable non-transitory medium of claim 20, wherein the stored instructions, when executed by one or more processors, further operatively enable the wireless communication system to transmit and receive wireless signals covering substantially the rear area of the vehicle.

24. The machine-readable non-transitory medium of claim 20, wherein the stored instructions, when executed by one or more processors, further operatively enable the wireless communication system to receive the indication of velocity information of the vehicle from a speedometer.

25. The machine-readable non-transitory medium of claim 20, wherein the stored instructions, when executed by one or more processors, further operatively enable the wireless communication system to receive the indication of velocity information of the vehicle from a global positioning system (GPS).

26. The machine-readable non-transitory medium of claim 20, wherein the stored instructions, when executed by one or more processors, further operatively enable the wireless communication system to determine the Doppler frequency shift compensation component based, at least in part, on a relationship between the received indication of velocity information of the vehicle, a nominal transmitter frequency for the wireless signals, and the propagation speed of light.

27. The machine-readable non-transitory medium of claim 20, wherein the stored instructions, when executed by one or more processors, further operatively enable the wireless communication system to determine the Doppler frequency shift compensation component based, at least in part, on a relationship between the received indication of velocity information of the vehicle, a nominal receiver frequency for the wireless signals, and the propagation speed of light.

28. The machine-readable non-transitory medium of claim 20, wherein the stored instructions, when executed by one or more processors, further operatively enable the wireless communication system to manage wireless signals in at least one of the side areas of the vehicle or an opposite side area of the vehicle.

* * * * *

UNITED STATES PATENT AND TRADEMARK OFFICE
CERTIFICATE OF CORRECTION

PATENT NO. : 9,544,028 B2
APPLICATION NO. : 14/764696
DATED : January 10, 2017
INVENTOR(S) : Siwiak Page 1 of 1

It is certified that error appears in the above-identified patent and that said Letters Patent is hereby corrected as shown below:

In the Specification

In Column 1, Line 9, delete "US.C. §371" and insert -- U.S.C. § 371 --, therefor.

In Column 1, Line 11, delete "herein by" and insert -- by --, therefor.

In Column 11, Line 33, delete "NV ports" and insert -- A/V ports --, therefor.

Signed and Sealed this
Ninth Day of May, 2017

Michelle K. Lee
*Director of the United States Patent and Trademark Office*